(12) United States Patent
Valkonen

(10) Patent No.: US 10,884,401 B2
(45) Date of Patent: Jan. 5, 2021

(54) MACHINE VISION METHOD AND SYSTEM FOR MONITORING MANUFACTURING PROCESSES

(71) Applicant: Procemex Oy, Jyväskylä (FI)

(72) Inventor: Mika Valkonen, Äänekoski (FI)

(73) Assignee: Procemex Oy, Jyväskylä (FI)

( * ) Notice: Subject to any disclaimer, the term of this patent is extended or adjusted under 35 U.S.C. 154(b) by 120 days.

(21) Appl. No.: 16/095,790

(22) PCT Filed: Apr. 28, 2017

(86) PCT No.: PCT/FI2017/050325
§ 371 (c)(1),
(2) Date: Oct. 23, 2018

(87) PCT Pub. No.: WO2017/191363
PCT Pub. Date: Nov. 9, 2017

(65) Prior Publication Data
US 2019/0129396 A1 May 2, 2019

(30) Foreign Application Priority Data
May 6, 2016 (FI) ...................................... 20165387

(51) Int. Cl.
*G05B 19/418* (2006.01)
*G01N 21/89* (2006.01)
(Continued)

(52) U.S. Cl.
CPC ..... *G05B 19/41875* (2013.01); *D21G 9/0009* (2013.01); *G01N 21/8901* (2013.01);
(Continued)

(58) Field of Classification Search
CPC .. D21F 1/0027; D21G 9/00; G05B 19/41875; G01N 21/8983
See application file for complete search history.

(56) References Cited

U.S. PATENT DOCUMENTS 5,590,577 A * 1/1997 Ruf ........................... D21F 7/04
162/255
5,815,198 A 9/1998 Vachtsevanos
(Continued)

FOREIGN PATENT DOCUMENTS

CN          1643211 A     7/2005
CN        202913300 U     5/2013
(Continued)

OTHER PUBLICATIONS

Finnish Patent and Registration Office, Search report of Finnish application No. 20165387, dated Nov. 15, 2016, 2 pages.

*Primary Examiner* — John J Lee
(74) *Attorney, Agent, or Firm* — Berggren LLP

(57) ABSTRACT

The invention relates to a method, a computer program product and a machine vision system (30), comprising at least one lighting device (34), at least one image sensor (31 *a-c*) and a data processing device (32), the system in a first mode illuminating a first object (35) using a first type of illumination and capturing images of the first object at a first image capturing frequency, when the first object (35) is on a second object (33), transmitting the captured image data to the data processing device for analysis, and changing the system for monitoring the second object in a second mode, if absence of the first object on the second object is detected from the image data, wherein said at least one image sensor (31 *a-c*) is reconfigured to capture images at a second image capturing frequency from the second object.

10 Claims, 4 Drawing Sheets

(51) Int. Cl.
*G01N 21/898* (2006.01)
*G05B 13/02* (2006.01)
*D21G 9/00* (2006.01)
*D21F 7/04* (2006.01)

(52) U.S. Cl.
CPC ......... *G01N 21/8983* (2013.01); *G05B 13/02* (2013.01); *D21F 7/04* (2013.01); *G01N 21/8903* (2013.01); *G05B 2219/31446* (2013.01); *G05B 2219/45222* (2013.01); *Y02P 90/02* (2015.11)

(56) References Cited

U.S. PATENT DOCUMENTS

| | | |
|---|---|---|
| 2002/0109112 A1 | 8/2002 | Guha et al. |
| 2004/0129398 A1 | 7/2004 | Munch et al. |
| 2006/0096726 A1 | 5/2006 | Ahvenainen et al. |
| 2008/0121362 A1* | 5/2008 | Bauer .................. D21F 7/04 162/198 |
| 2009/0060316 A1 | 3/2009 | Ruuska |
| 2009/0237664 A1 | 9/2009 | Bauer et al. |
| 2010/0214416 A1 | 8/2010 | Ruuska |
| 2013/0008622 A1 | 1/2013 | Abraham et al. |
| 2015/0153278 A1 | 6/2015 | Erkelenz et al. |

FOREIGN PATENT DOCUMENTS

| | | |
|---|---|---|
| CN | 104302833 A | 1/2015 |
| DE | 102011078010 A1 | 12/2012 |
| DE | 102011113670 A1 | 3/2013 |
| EP | 0300734 A2 | 1/1989 |
| EP | 0587037 A2 | 3/1994 |
| EP | 1524363 A1 | 4/2005 |
| EP | 1722030 A1 | 11/2006 |
| EP | 1925725 A1 | 5/2008 |
| EP | 2042654 A2 | 4/2009 |
| JP | 2000111493 A | 4/2000 |
| WO | 03039156 A1 | 5/2003 |
| WO | 03046529 A1 | 6/2003 |
| WO | 03080928 A1 | 10/2003 |
| WO | 2008107892 A1 | 9/2008 |
| WO | 2009014939 A2 | 1/2009 |
| WO | 2012049370 A1 | 4/2012 |
| WO | 2015001196 A1 | 1/2015 |

* cited by examiner

MACHINE VISION METHOD AND SYSTEM FOR MONITORING MANUFACTURING PROCESSES

PRIORITY

This application is a U.S national application of the international application number PCT/FI2017/050325 filed on Apr. 28, 2017 and claiming priority of Finnish national application number 20165387 filed on May 6, 2016, the contents of both of which are incorporated herein by reference.

TECHNICAL FIELD

The present invention relates to a method for imaging of continuous manufacturing processes, in which method a camera is used for imaging and a lighting device is used for illuminating a continuous product and fabrics under the continuous product.

The invention also relates to a system and a computer program product causing a system to carry out the method.

BACKGROUND

In continuous manufacturing processes, there are materials or products constantly running through the machine. In such processes, materials and products must be monitored in order to detect possible deviations or web breaks. Furthermore, condition of fabrics under materials or products is checked during scheduled or planned downtimes of a machine/machinery in order to detect possible deviations that may cause those above-mentioned deviations to materials or products or web breaks, but which could also cause unscheduled or planned downtimes of a machine/machinery. The product, machine or process may be monitored, for example, by machine vision systems such as camera systems. The captured images are analysed by a processing unit.

SUMMARY

Now there has been invented an improved method and technical equipment implementing the method. Various aspects of the invention include a method, a machine vision system with two different operating modes for two different objects, and a computer readable medium comprising a computer program stored therein, which are characterized by what is stated in the independent claims. Various embodiments of the invention are disclosed in the dependent claims.

According to a first aspect of the invention, there is provided a method comprising: monitoring a first object in a first operating mode of a machine vision system comprising at least one lighting device, at least one image sensor and a data processing device, wherein the monitoring in a first operating mode comprises illuminating the first object by said at least one lighting device using a first type of illumination and capturing images of the first object by said at least one image sensor at a first imaging frequency, and wherein the first object is arranged at least partly on a second object, transmitting the captured image data of the captured images to the data processing device for analysis, and changing the machine vision system for monitoring the second object in a second operating mode, if absence of the first object on the second object is detected by the data processing device.

According to an embodiment, in the second operating mode said at least one lighting device is reconfigured to use a second type of illumination for illuminating the second object to be monitored. According to an embodiment, in the second operating mode said at least one camera sensor is reconfigured to capture images at a second image capturing frequency from the second object to be monitored. According to an embodiment, in the second operating mode image analysing parameters of the data processing device are reconfigured for detecting deviations from the second object to be monitor. According to an embodiment, the absence of the first object on the second object is detected by the data processing device from captured image data. According to an embodiment, the absence is detected from a received external indication signal. According to an embodiment, the first object is a material web and the second object is a machine clothing. According to an embodiment, the method further comprises: changing the machine vision system for monitoring in the first operating mode, if presence of the first object on the second object is detected in the second operating mode by the data processing device.

According to a second aspect of the invention, there is provided a machine vision system comprising at least one lighting device, at least one image sensor and a data processing device, and wherein the machine vision system is arranged to monitor a first object in a first operating mode and a second object in a second operating mode, and wherein in the first operating mode at least one lighting device is arranged to illuminate the first object using a first type of illumination, and said image sensor is arranged to capture images of first object at a first imaging frequency and to transmit said captured image data to the data processing device for analysing, and if absence of the first object on the second object is detected by the data processing device, the machine vision system is changed to the second operating mode, wherein in the second operating mode at least one lighting device is arranged to illuminate the second object using a second type of illumination.

According to an embodiment, in the second operating mode said at least one lighting device is reconfigured to use a second type of illumination for illuminating the second object to be monitored. According to an embodiment, in the second operating mode said at least one camera sensor is reconfigured to capture images at a second image capturing frequency from the second object to be monitored. According to an embodiment, in the second operating mode image analysing parameters of the data processing device are reconfigured for detecting deviations from the second object to be monitored. According to an embodiment, the absence of the first object on the second object is detected by the data processing device from captured image data or detected from a received external indication signal. According to an embodiment, the first object is a material web and the second object is a machine clothing. According to an embodiment, the method further comprises: changing the machine vision system for monitoring the first object in the first operating mode, if presence of the first object on the second object is detected in the second operating mode by the data processing device.

According to a second aspect of the invention, there is provided a computer program product, stored on a computer readable medium and executable in a computing device, wherein the computer program product comprises instructions to perform a method, wherein the method comprises: monitoring a first object in a first operating mode of a machine vision system comprising at least one lighting device, at least one image sensor and a data processing device, wherein the monitoring in a first operating mode comprises illuminating the first object by said at least one lighting device using a first type of illumination and capturing images of the first object by said at least one image sensor at a first imaging frequency, and wherein the first object is arranged at least partly on a second object, transmitting the captured image data of the captured images to the data processing device for analysis, and changing the machine vision system for monitoring the second object in a second operating mode, if absence of the first object on the second object is detected by the data processing device.

According to an embodiment, in the second operating mode said at least one lighting device is reconfigured to use a second type of illumination for illuminating the second object to be monitored. According to an embodiment, in the second operating mode said at least one camera sensor is reconfigured to capture images at a second image capturing frequency from the second object to be monitor. According to an embodiment, in the second operating mode image analysing parameters of the data processing device are reconfigured for detecting deviations from the second object to be monitored. According to an embodiment, the absence of the first object on the second object is detected by the data processing device from captured image data. According to an embodiment, the absence is detected from a received external indication signal. According to an embodiment, the first object is a material web and the second object is a machine clothing. According to an embodiment, the method further comprises: changing the machine vision system for monitoring in the first operating mode, if presence of the first object on the second object is detected in the second operating mode by the data processing device.

DESCRIPTION OF THE DRAWINGS

In the following, various embodiments of the invention will be described in more detail with reference to the appended drawings, in which FIG. 1a, b show a machine vision system according to an example embodiment.

DESCRIPTION OF EXAMPLE EMBODIMENTS

Figure 1A:
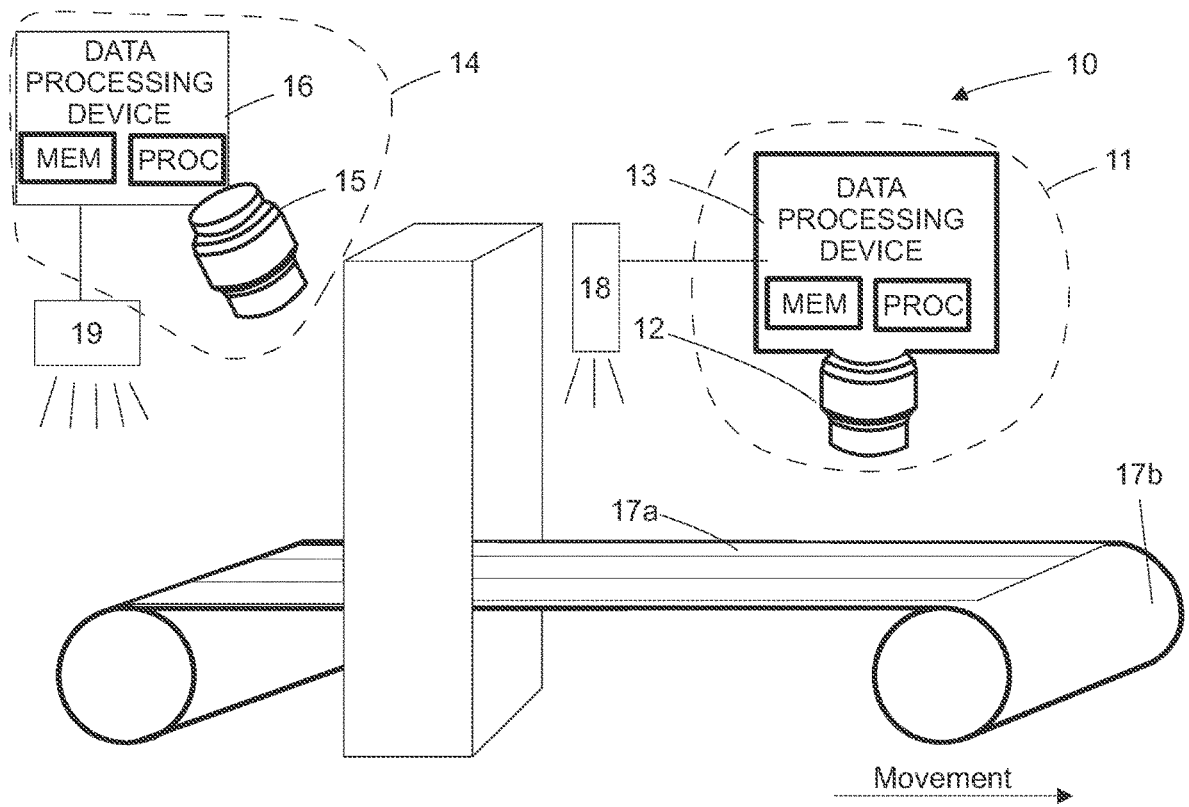

The present invention relates to a machine vision system according to example embodiments having two different operating modes for two different objects and comprising at least one image sensor used for imaging a web product and machine clothing and at least one lighting device for illuminating the web product and the machine clothing. The web product may be a first object and it is imaged and illuminated in the first operating mode of the machine vision system. The machine clothing is the second object and it is imaged and illuminated in the second operating mode of the machine vision system.

The term "web product" refers in this context to any type of a wood fibre web. The term "wood fibre" refers in this context to any suitable wood fibre webs, for example, paper, cellulose or cardboard webs. The term "machine clothing" refers in this context to any type of fabric used, for example, in a paper, cardboard of cellulose machine/machinery for dewatering and/or transporting the web product. It may be, for example, a woven textile belt of felt. The web product and the machine clothing is illuminated and imaged in order to find web deviations from the web product and clothing deviations from the machine clothing. The term "web deviation" includes in this context any deviation detectable from the web product, for example, a defect, a hole, a stain, a definite change, a grey or dark spot, a streak, a wrinkle, an air bubble or a pattern in a web. The term "clothing deviation" includes in this context any deviation detectable from the machine clothing, for example, a defect, a hole, or a risen yarn etc. that may possibly cause machine clothing-related web defect(s). Machine clothing contributes to product quality, fibre and chemical conversion efficiency, and production speed.

As stated above, a machine vision system according to embodiments of the invention may comprise at least one image sensor, at least one lighting device and data processing device. The image sensor is used for capturing images of at least two different kinds of objects, for example, a web and machine clothing and the lighting device is used for lighting the objects arranged to be imaged. The machine vision system may have at least two different operating modes, wherein each mode is arranged to be suitable for a certain target: a first operating mode for the web product and the second operating mode for the machine clothing. Different operating modes may have different lighting and also the imaging frequency may be different. The operating mode may be selected on basis of the imaging target for enabling effective detecting of errors from both objects.

As discussed, the operating mode being used depends on the object. In the first operating mode the first object, the web product, is illuminated by a first type of illumination and images of the first object is captured at a first imaging frequency and in the second operating mode the second object, the machine clothing, are illuminated by a second type of illumination and images of the first object are continued to be captured at the first imaging frequency but possibly it is changed to the second imaging frequency. When at least one camera of the machine vision system is imaging and at least one lighting device is used for illuminating the web product in the first operating mode and the web product ends, for example, in a case of a web break, a camera sensor of the machine vision system detects the absence of the web or an external indication signal about the web break is transmitted to the machine vision system, for example, from a paper machine control system, the first operating mode of the machine vision system used for imaging and illuminating the web product is arranged to be changed to the second operating mode for imaging and illuminating the machine clothing. A second mode reconfiguration signal is at least transmitted to at least one lighting device for reconfiguring the at least one lighting device to the second operating mode. It is also possibly that a second mode reconfiguration signal is also transmitted to at least one camera sensor for reconfiguring the at least one camera sensor.

Respectively, when in the second operating mode the machine vision system detects that the web product is on the machine clothing or an external indication signal indicates to the machine vision system that the web product is on the machine clothing, the second operating mode of the machine vision system is changed to the first operating mode for imaging and lighting the web product until the next web break results in changing to the second operating mode.

When operating mode changes, also the illumination changes, for example, the type of lights, the number of lights, the direction of lights, the operation of lights or lights being used may change to be more suitable for imaging the object in question. In other words, illumination changes when imaging object changes so that illumination depends on the object to be illuminated. When operating mode changes, the reconfiguration signal may also determine for the image sensor(s) a resolution of images to be captured or how the images should overlap. However, in addition to changing illumination and possibly also imaging frequency, it is possible that when operating mode changes also image analysing parameters of the data processing device are reconfigured to be more suitable for current object. For example, in the first operating mode image analysing parameters are suitable for detecting deviations in a web product and in the second operating mode image analysing parameters are suitable for detecting deviations in machine clothing. There may be a need for different analysing parameters in different operating modes, because the type of deviations may be different in the web product and in the machine clothing. The colour of the web product and the machine clothing may be different, which may also cause a need for different image analysing parameters.

An image sensor of the machine vision system may be, for example, a camera, for example, a c-mos or ccd camera, a matrix or line scan camera, a black and white or colour camera, a regular or smart camera, or any suitable camera. Targets arranged to be monitored may be illuminated for imaging by at least one lighting device and a lighting device of the machine vision system may be, for example, a LED or one lighting device may comprise two, three, four or a plurality of LEDs.

The present invention further relates to a method according to example embodiments of the invention, wherein in a so called first operating mode one or more images of a web product are captured by one or more image sensors when illuminated by one or more lighting device. When the web product ends, for example, in a case of a web brake, or is no more in the process, the machine vision system detects the situation from images captured by one or more image sensor(s) or it receives an external indication signal about the web brake, the machine vision system is changed to the second operating mode for imaging and illuminating the machine clothing. The type of illumination and possibly also the image capturing frequency in the first and second operating mode may be different.

In the second operating mode at least one camera sensor image may capture images and at least one lighting device may illuminate the second type of illumination a predetermined time. In other words, it is possible that they do not continue capturing of images and illuminating until the second operating mode changes to the first operating mode. The machine clothing may comprise a seam or a kind of marking. The imaging and the second type of illumination may be continued at least until the seam or the some kind of marking in the web is detected from the machine clothing at least twice. This way it is ensured that the whole web product is imaged, but unnecessary imaging is avoided.

Image data of captured images is analysed by a data processing device of each image sensor of a machine vision system and/or image data of captured images is transmitted to an external data processing device of the machine vision system for analysis. The external data processing device is a data processing device that is not an integrated part of a camera. The data processing device may monitor the data in order to find deviation(s) in image data of a web product and/or image data of machine clothing.

FIG. 1 *a* shows an embodiment of the invention, in which a machine vision system 10 is disclosed in conjunction with two objects, a web 17*a* and machine clothing 17*b*. The machine vision system 10 comprises two lighting devices 18, 19 and two smart cameras 11, 14 comprising an image sensor 12, 15 and a data processing device 13, 16. Lighting devices 18, 19 illuminates the movable web 17*a* and the machine clothing 17*b* when the web 17*a* is not available. The image sensors 12, 15 are arranged to capture images from the movable web 17*a* and from the machine clothing 17*b* when the web 17*a* is not available and to transmit image data to the data processing device 13, 15 of the smart camera 11, 14.

The data processing devices 13, 16 comprise at least one processor, at least one memory including computer program code for one or more program units, and means for receiving image data wirelessly or via wired connection from the image sensor 12, 15, for example, a receiver or a transceiver, and means for transmitting trigger signals wirelessly or via wired connection, for example, a transmitter or a transceiver. There may be multiple processors e.g. a general purpose processor and a graphics processor and a DSP processor and/or multiple different memories e.g. volatile memory for storing data and programs at run-time and nonvolatile memory such as a hard disk for permanently storing data and programs. The data processing device 13 of the smart camera 11 and the data processing device 16 of the smart camera 14 may be any computing device suitable for handling image data such as a computer. The data processing device 13 is in electronic communication with the image sensor 11 and the lighting device 18 via signal lines and the data processing device 16 is in electronic communication with the image sensor 12 and the lighting device 19 via signal lines. The lighting devices 18, 19 may also be integrated parts of the smart cameras 11, 14. The smart cameras 11, 14 may also include a video controller and an audio controller for generating signals that can be produced for the user with computer accessories. The smart cameras 11, 14 produce output to the user through output means. The video controller may be connected to a display. The display may be e.g. a flat panel display or a projector for producing a larger image. The audio controller may be connected to a sound source, such as loudspeakers or earphones. The smart cameras 11, 14 may also include an acoustic sensor such as a microphone.

When the web 17*a* is on the machine clothing 17*b* as in FIG. 1 *a*, the image sensors 12, 15 are arranged to capture images of the web 17*a* and the lighting devices 18, 19 are illuminating the web 17*a* in the first operating mode. The data processing devices 13, 16 are configured to receive captured images as image data and analyse the image data in order to find deviations in the web 17*a*. The data processing devices 13, 16 analyse the image data. If the data processing device 13 detects from the image data that the web 17*a* is not on the machine clothing 17*b*, it may reconfigure the image sensors 12, 15 and the machine vision system 10 to a second operating mode. The data processing devices 13, 16 are still configured to receive images captured in the second operating mode as image data and analyse the image data in order to find deviations in the machine clothing 17*b*.

Figure 1B:
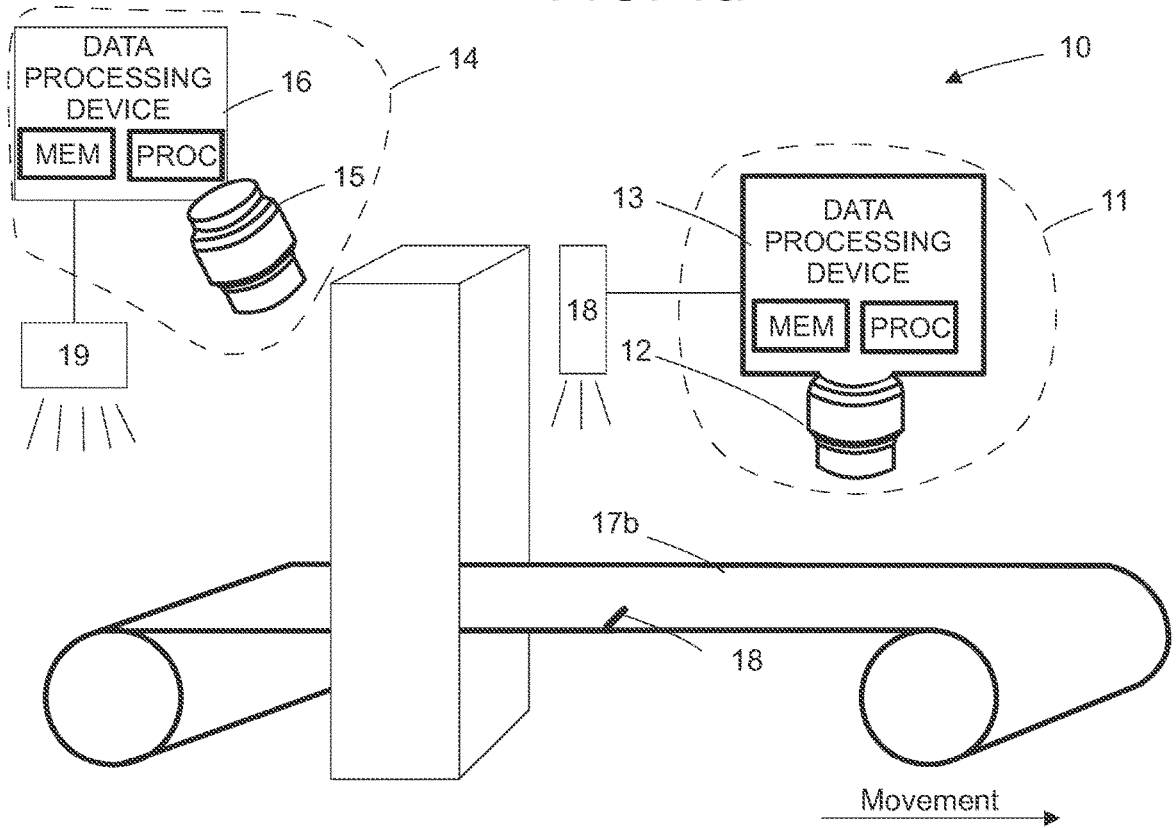

As mentioned above, after reconfiguration the image sensors 12, 15 continue to capture images of the machine clothing 17*b* in the second operating mode. In the second operating mode the image capturing frequency may be different or it may remain the same. The second image capturing frequency of the second operating mode may be, for example, higher than the first image capturing frequency of the first operating mode so that deviations in the machine clothing 17*b* can be more accurately imaged and detected. Deviations in the machine clothing 17*b* may be more difficult to detect, so there is a need to capture more images of the machine clothing 17b in order to enable more efficient monitoring of deviations in the machine clothing 17b. In the second operating mode, the lighting devices 18, 19 are arranged to illuminate the machine clothing 17b in the second operating mode, wherein the type of illumination of the second operating mode is different than the type of illumination of the first operating mode. There may be a need, for example, for more efficient lighting when imaging the machine clothing 17b in the second operating mode, therefore the intensity of light of lighting devices 18, 19 may be increased or there may be a need for less efficient lighting when imaging the machine clothing 17b in the second operating mode, therefore the intensity of light of lighting devices 18, 19 may be decreased. Imaging of the machine clothing 17b in the second operating mode at the second image capturing frequency is shown in FIG. 1b. The need of the intensity of light of lighting devices 18, 19 may depend, for example, on the colour of the machine clothing 17b compared to the web 17a.

In the second operating mode, the image sensors 12, 15 capture images from at least the whole machine clothing cycle, for example, at least from a marking 18 to the marking 18 i.e. until the marking 18 is detected twice in the images captured by image sensors 12, 15 by the data processing devices 13, 16.

Figure 2A:
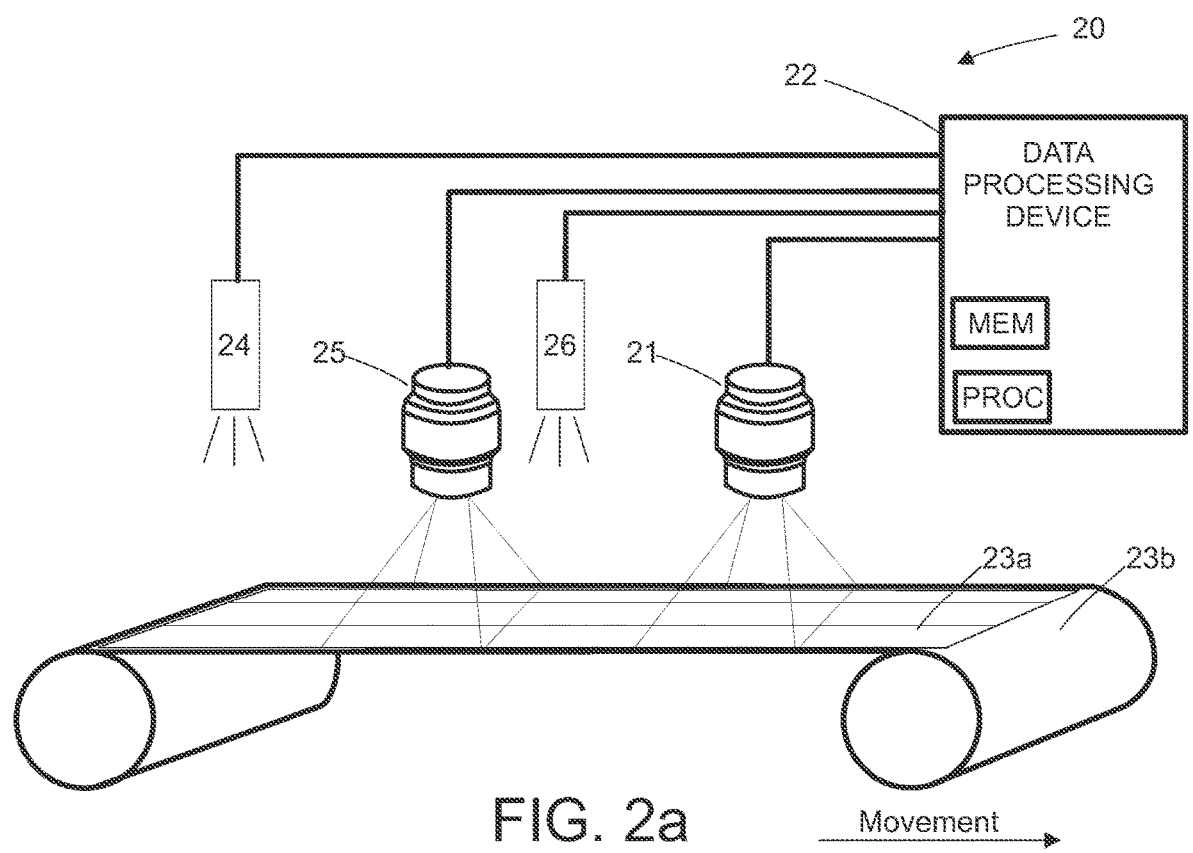
FIG. 2 a, b show a machine vision system according to an example embodiment.

FIG. 2a shows an embodiment of the invention, in which a machine vision system 20 is disclosed in conjunction with two objects, a web 23a and machine clothing 23b. The machine vision system 20 comprises at least two image sensors 21, 25, at least two lighting devices 24, 26 and a data processing device 22 for analysing image data captured by the at least two image sensors 21, 25. The image sensors 21, 25 are arranged to capture images from the moving object 23a that is a material web in a first operating mode and arranged to capture images from the second moving object 23b that is a machine clothing in a second operating mode and to transmit data of each image to the data processing device 22. The lighting devices 24, 26 are arranged to illuminate the moving objects 23a, 23b while imaging so that in both operating modes the illumination type being used is different.

The data processing device 22 comprises at least one processor, at least one memory including computer program code for one or more program units, and means for receiving image data wirelessly or via a wired connection, for example, a receiver or a transceiver, and means for transmitting configurations by reconfiguration signals wirelessly or via a wired connection, for example, a transmitter or a transceiver, to the lighting devices 24, 26 and also possibly to the image sensors 21, 25. There may be multiple processors e.g. a general purpose processor and a graphics processor and a DSP processor, and/or multiple different memories e.g. volatile memory for storing data and programs at run-time, and nonvolatile memory such as a hard disk for permanently storing data and programs. The data processing device 22 may be any computing device suitable for handling image data, such as a computer. The data processing device 22 is in electronic communication with the image sensors 21, 25 and the lighting devices 24, 26 via signal lines. For handling the signals to/from the signal lines, the data processing device 22 comprises I/O circuitry. The connection between the lighting devices 24, 26 and the data processing device 22 and the image sensors 21, 25 and the data processing device 22 is a wired or wireless network. The data processing device 22 may also include a video controller and an audio controller for generating signals that can be produced to the user with computer accessories. The video controller may be connected to a display. The display may be e.g. a flat panel display or a projector for producing a larger image. The audio controller may be connected to a sound source, such as loudspeakers or earphones. The data processing device 22 may also include an acoustic sensor, such as a microphone. The lighting devices 24, 26 may also be integrated parts of the camera sensors 21, 25.

The data processing device 22 is configured to analyse the received images captured by the image sensors 21, 25 and if the data processing device 22 detects a deviation or a web break in the first operating mode or presence of a web in the second operating mode, it may indicate it for the process operator and/or transmit reconfiguration signals to at least one lighting device and possibly also to the image sensors.

When the web 23a is on the machine clothing 23b as in FIG. 2a, the image sensors 21, 25 are arranged to capture images of the web 23a and the lighting devices 24, 26 are illuminated the web 23a in the first operating mode. The data processing device 22 is configured to receive captured image as image data. The data processing device 22 is arranged to analyse the image data. If the data processing device 22 detects from the image data that the web 23a is not on the machine clothing 23b, it may reconfigure the image sensors 21, 25 and the lighting devices 24, 26 to a second operating mode for capturing images of the machine clothing 23b and illuminating the web machine clothing 23b. The data processing device 22 is configured to receive images captured in the second operating mode as image data and analyse the image data in order to find deviations in the machine clothing 23b.

Figure 2B:
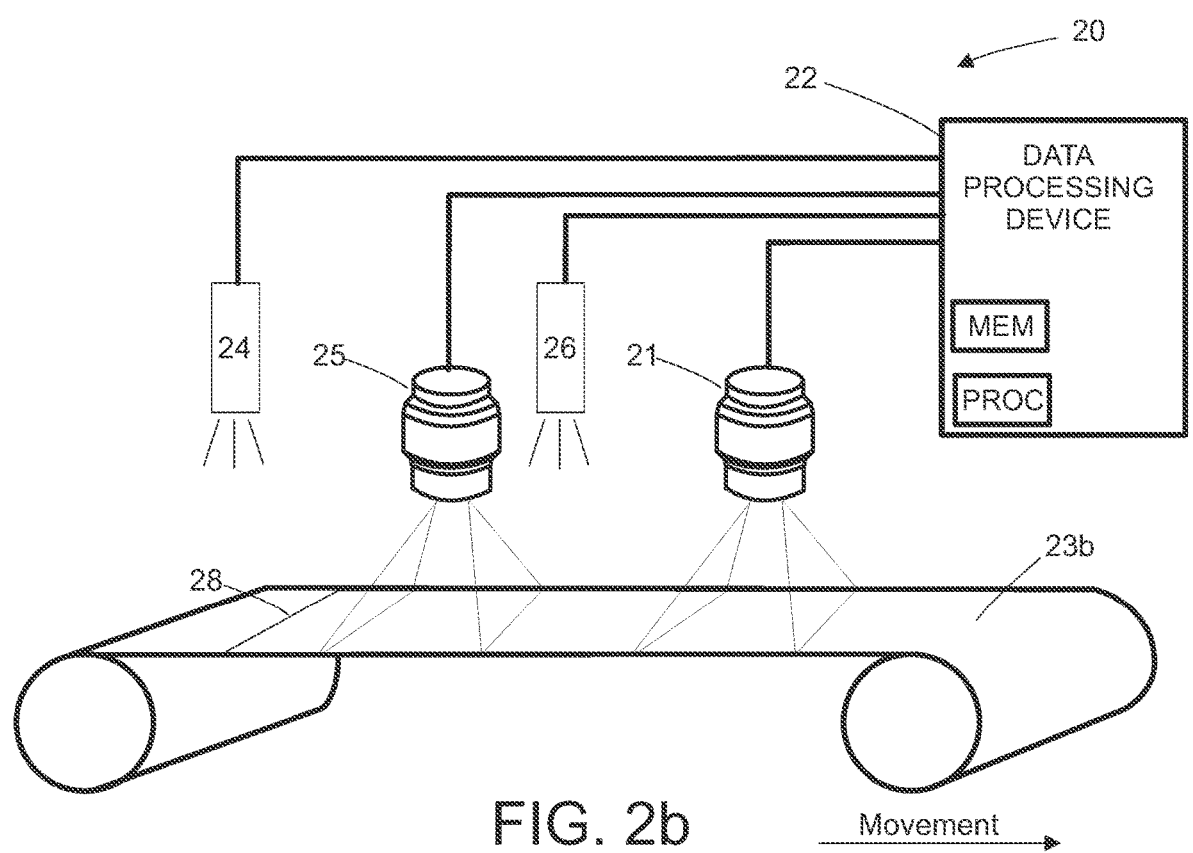

As mentioned above, after reconfiguration to the second operating mode, the image sensors 21, 25 are arranged to capture images of the machine clothing 23b in the second operating mode. In the second operating mode, the image capturing frequency may be different or it may remain the same compared to the first operating mode. The second image capturing frequency of the second operating mode may be, for example, higher than the first image capturing frequency of the first operating mode so that deviations in the machine clothing 23b can be more accurately imaged and detected or the second image capturing frequency may be the same in the first and in the second operating mode. The lighting devices 24, 26 may be arranged to illuminate the machine clothing 23b in the second operating mode, for example, more efficiently or less efficiently than in the first operating mode depending on the configurations. Imaging of the machine clothing 23b in the second operating mode at the second image capturing frequency is shown in FIG. 2b.

The image sensors 21, 25 capture images from at least the whole machine clothing cycle of the machine clothing 23b, for example, at least from a seam 28 of the machine clothing 23b to seam 28 i.e. until the seam 28 is detected twice in the images captured by image sensors from the seam 28 by the data processing device 22.

Figure 3A:
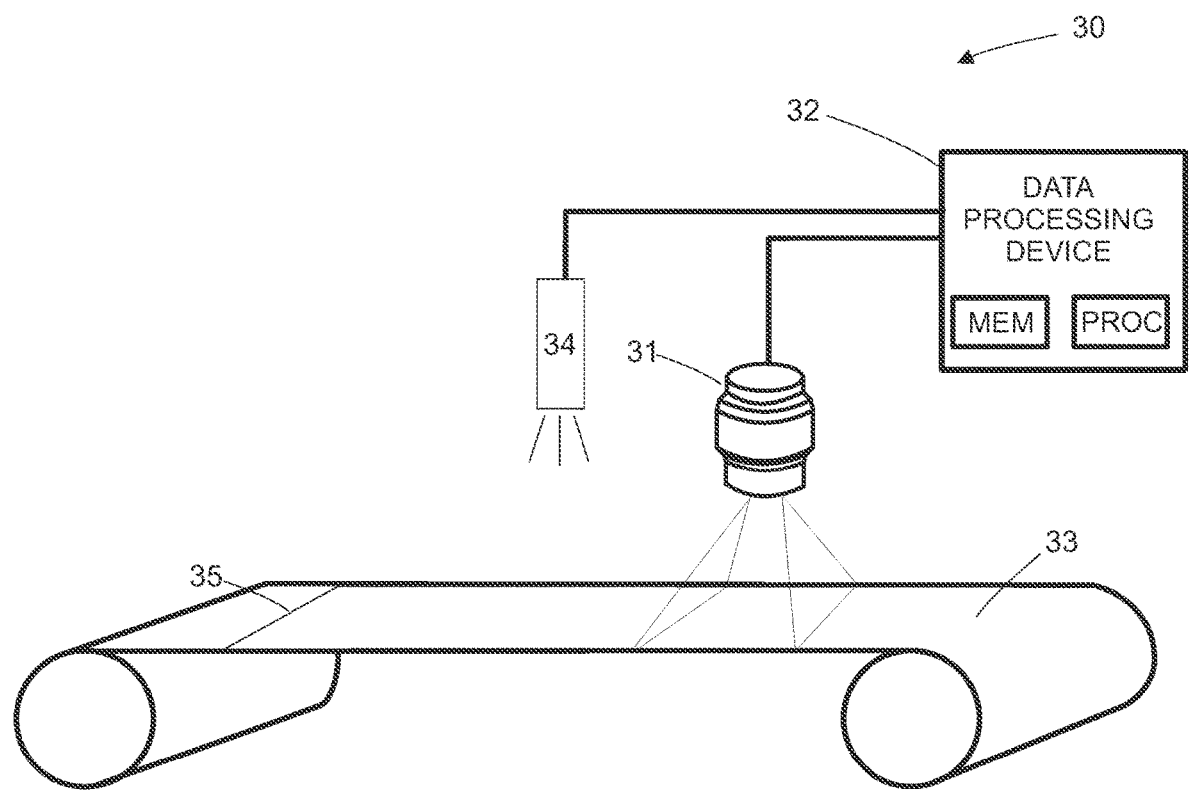
FIG. 3 a, b show a machine vision system according to an example embodiment.

FIG. 3a shows an embodiment of the invention, in which a machine vision system 30 is disclosed in conjunction with a machine clothing 33 as a moving object. The machine vision system 30 comprises an image sensor 31, a lighting device 34 and a data processing device 32 for analysing image data captured by the image sensor 31. The image sensor 31 is arranged to capture images from a material web (currently not on the machine clothing 33) in a first operating mode and arranged to capture images from the machine clothing 33 in a second operating mode and to transmit data of each image to the data processing device 32. The lighting device 34 is arranged to illuminate the machine clothing 33 (or the material web when available) while imaging so that in both operating modes the illumination type being used is different. The lighting device 34 may also be integrated parts of the camera sensor 31. The data processing device 32 is configured to analyse the received images captured by the image sensor 31.

Figure 3B:
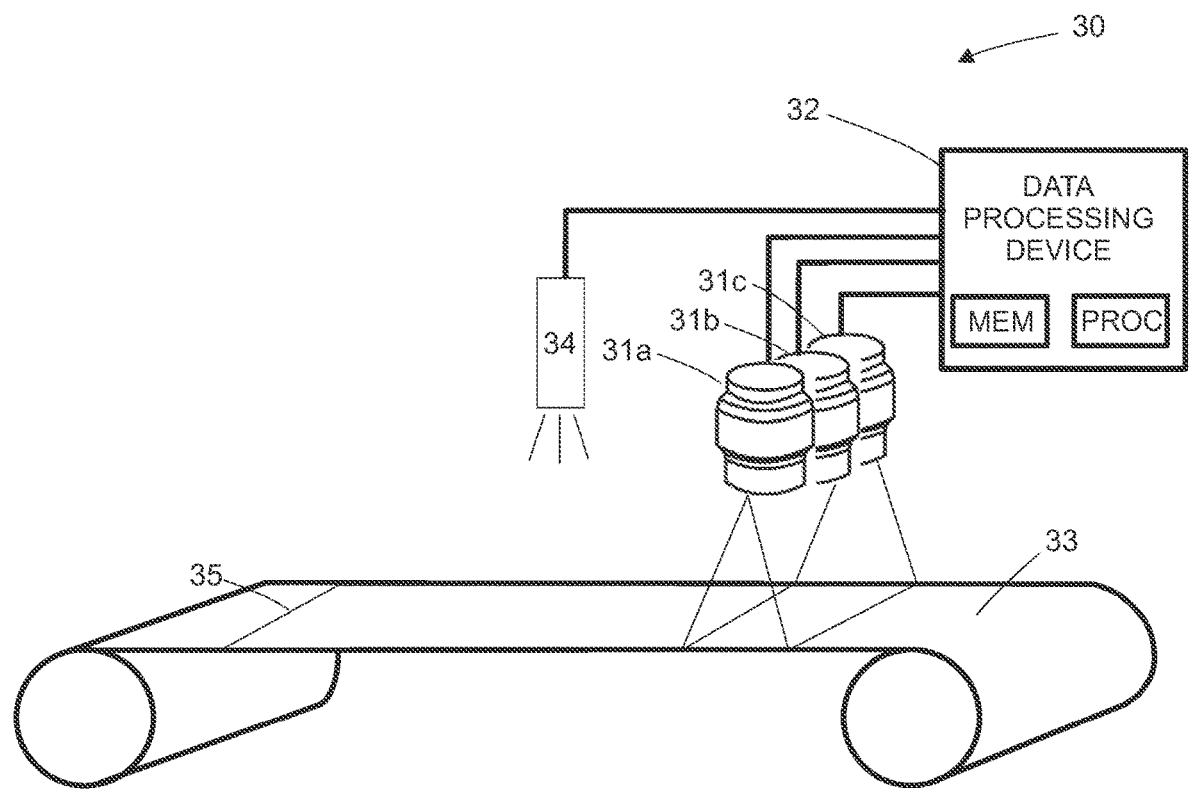

FIG. 3b shows an embodiment of the invention, in which a machine vision system 30 is disclosed in conjunction with a machine clothing 33 as a moving object. The machine vision system 30 comprises three image sensors 31a, 31b, 31c, a lighting device 34 and a data processing device 32 for analysing image data captured by the image sensors 31a, 31b, 31c arranged in parallel for imaging the whole width of the machine clothing 33 (and a material web when on the machine clothing 33). The image sensors 31a, 31b, 31c are arranged to capture images from the material web in a first operating mode and arranged to capture images from the machine clothing 33 in a second operating mode and to transmit data of each image to the data processing device 32. The lighting device 34 is arranged to illuminate the machine clothing 33 (or the material web when available) while imaging so that in both operating modes the illumination type being used is different. The lighting device 34 may also be an integrated part of a camera sensor.

Figure 4:
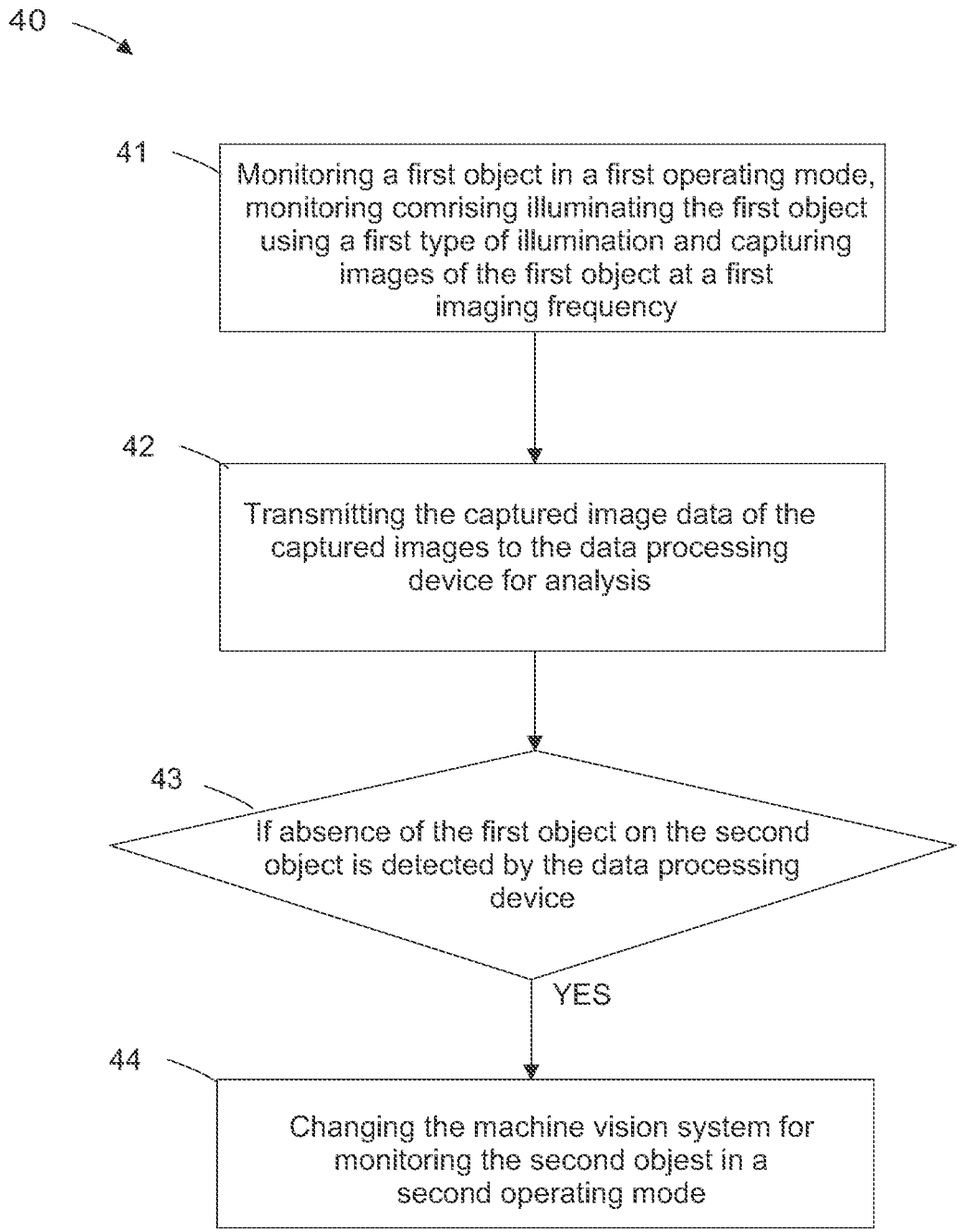
FIG. 4 shows a monitoring method of a machine vision system according to an example embodiment.

FIG. 4 shows a monitoring method 40 of a machine vision system according to an example embodiment. The machine vision system comprises at least one lighting device, at least one image sensor and a data processing device. In step 41, the machine vision system is monitoring a first object, for example, a material web in a first operating mode. In a first operating mode the first object is illuminated by said at least one lighting device using a first type of illumination and images of the first object are captured by said at least one image sensor at a first imaging frequency, and wherein the first object is arranged at least partly on a second object. The second object may be, for example, a machine clothing. In step 42, the captured image data of the captured images is transmitted to the data processing device for analysis. In step 44, the machine vision system changes to monitor the second object in a second operating mode, if absence of the first object on the second object is detected by the data processing device in step 43.

In many cases, in the second operating mode the second object is illuminated by said at least one lighting device using a second type of illumination and images of the second object are captured by said at least one image sensor at a second imaging frequency, wherein the first type of illumination is different that the second type of illumination and the second imaging frequency is different than the first imaging frequency. However, in the second operating mode, it may be possible, that the first type of illumination is the same than the second type of illumination or that the second imaging frequency is the same than the first imaging frequency.

The various embodiments of the invention can be implemented with the help of computer program code that resides in a memory and causes an apparatus to carry out the invention. For example, the apparatus that is a computing device, for example, a data processing device may comprise circuitry and electronics for analysing, receiving and transmitting data, a computer program code in a memory, and a processor which, when running the computer program code, causes the apparatus to carry out the features of an embodiment. The processor, when running the computer program code, may carry out the steps of the following method: capturing image(s) of a first object by an image sensor, for example, a camera sensor, a first illumination in a first operating mode and capturing image(s) of a second object by the image sensor in a second illumination in a second operating mode, when absence of the first object is detected.

Considerable advantages are achieved by the present invention when compared to methods and systems of existing machine vision systems comprising at least an image sensor e.g. a camera suitable for capturing images. By means of the arrangement according to the invention it is possible to use the same image sensor for two different objects both needing at least different type of illumination, because the machine vision system has two different operating modes. The first mode comprises imaging at a first image capturing frequency at a first illumination and the second mode comprises imaging at a second image capturing frequency at a second illumination, wherein the change of operating mode from the first mode to the second mode is performed, when it is detected that the first imaging target is unavailable and from the second mode to the first mode is performed, when it is detected that the first imaging target is available again.

It is obvious that the present invention is not limited solely to the above-presented embodiments, but it can be modified within the scope of the appended claims.

The invention claimed is:

1. A method, comprising:
monitoring a first object in a first operating mode of a machine vision system comprising at least one lighting device, at least one image sensor and a data processing device, wherein the monitoring in a first operating mode comprises illuminating a first object by said at least one lighting device using a first type of illumination and capturing images of the first object by said at least one image sensor at a first image capturing frequency, and wherein the first object is arranged at least partly on a second object;
transmitting the captured image data of the captured images to the data processing device for analysis; and
changing the machine vision system for monitoring the second object in a second operating mode and for transmitting the captured image data to the data processing device for analysis, if absence of the first object on the second object is detected from the image data captured in the first operating mode by the data processing device, wherein in the second operating mode intensity of light of at least one lighting device is increased or decreased for enabling effective detecting of deviations from the second object.

2. The method according to claim 1, wherein in the second operating mode said at least one lighting device is reconfigured to use a second type of illumination for illuminating the second object to be monitored.

3. The method according to claim 1, wherein the first object is a material web and the second object is a machine clothing.

4. The method according to claim 1, wherein the method further comprises: changing the machine vision system for monitoring in the first operating mode, if presence of the first object on the second object is detected in the second operating mode from the image data captured in the second operating mode by the data processing device.

5. A machine vision system comprising:
at least one lighting device, at least one image sensor and a data processing device, wherein the machine vision system is arranged to monitor a first object in a first operating mode and a second object in a second operating mode, wherein in the first operating mode at least one lighting device is arranged to illuminate the first object using a first type of illumination, and said image sensor is arranged to capture images of first object at a first image capturing frequency and to transmit said captured image data to the data processing device for analysing, wherein if absence of the first object on the second object is detected from the captured image data by the data processing device, the machine vision system is changed to the second operating mode for monitoring the second object in a second operating mode and for transmitting the captured image data to the data processing device for analysis, and wherein in the second operating mode intensity of light of at least one lighting device is increased or decreased for enabling effective detecting of deviations from the second object.

6. A method according to claim 1, wherein in the second operating mode a type of lights, a number of lights, a direction of lights, operation of lights or lights being used in at least one lighting device is different than in the first operating mode.

7. A computer program product, stored on a non-transitory computer readable medium and executable in a computing device, wherein the computer program product comprises instructions to cause the system of claim 5 to perform a method according claim 1.

8. The machine vision system according to claim 7, wherein in the second operating mode said at least one lighting device is reconfigured to use a second type of illumination for illuminating the second object to be monitor.

9. The machine vision system according to claim 7, wherein the first object is a material web and the second object is a machine clothing.

10. The machine vision system according to claim 7, wherein the method further comprises: changing the machine vision system for monitoring the first object in the first operating mode, if presence of the first object on the second object is detected in the second operating mode by the data processing device.

* * * * *